United States Patent
Sauer et al.

(10) Patent No.: US 10,785,092 B2
(45) Date of Patent: Sep. 22, 2020

(54) SYSTEM AND METHOD FOR PROVIDING FAULT TOLERANT STREAMING OF SEGMENTED CONTENT AND CACHE COHERENCY ON MULTI-HOSTED ORIGIN SYSTEMS

(71) Applicant: Skitter, Inc., Norcross, GA (US)

(72) Inventors: Mark Sauer, Bragg Creek (CA); Robert Saunders, Alpharetta, GA (US); David Borges, Buford, GA (US)

(73) Assignee: Skitter, Inc., Norcross, GA (US)

( * ) Notice: Subject to any disclaimer, the term of this patent is extended or adjusted under 35 U.S.C. 154(b) by 360 days.

(21) Appl. No.: 15/662,870

(22) Filed: Jul. 28, 2017

(65) Prior Publication Data

US 2019/0036763 A1     Jan. 31, 2019

(51) Int. Cl.
| | |
|---|---|
| *H04L 12/24* | (2006.01) |
| *H04N 21/24* | (2011.01) |
| *H04N 21/231* | (2011.01) |
| *H04L 29/06* | (2006.01) |
| *H04L 29/08* | (2006.01) |

(52) U.S. Cl.
CPC ........ *H04L 41/0654* (2013.01); *H04L 63/061* (2013.01); *H04L 65/4069* (2013.01); *H04L 67/2842* (2013.01); *H04L 67/42* (2013.01); *H04N 21/23106* (2013.01); *H04N 21/23116* (2013.01); *H04N 21/2404* (2013.01)

(58) Field of Classification Search
CPC ............. H04L 41/0654; H04L 63/061; H04L 67/2842; H04L 67/42; H04N 21/23106; H04N 21/23116; H04N 21/2404
See application file for complete search history.

(56) References Cited

U.S. PATENT DOCUMENTS

| | | | |
|---|---|---|---|
| 7,159,234 B1 | 1/2007 | Murphy et al. | |
| 9,344,493 B1* | 5/2016 | Anand | ................ H04L 67/2861 |
| 9,426,244 B2* | 8/2016 | Wang | ..................... G06Q 30/06 |
| 10,129,317 B2* | 11/2018 | Ramamurthy | ..... H04N 21/2393 |
| 10,135,611 B1* | 11/2018 | Martell | ................... H04L 9/083 |

(Continued)

OTHER PUBLICATIONS

PCT Application No. PCT/US2018/044017, International Search Report and Written Opinion dated Oct. 22, 2018.

*Primary Examiner* — Todd L Barker
(74) *Attorney, Agent, or Firm* — Meunier Carlin & Curfman LLC

(57) ABSTRACT

Multiple segmentation servers are synchronized to provide failover capacity in such a way that should a failover occur, the segment numbers/playlists/encryption keys/decryption keys are identical on each of the segmentation servers. Synchronizing the contents of a segmentation server on one or more backup segmentation servers ensures that the delivery of a content stream is immune to the failure of segmentation servers, provided at least one segmentation server remains fault-free. A caching server may further facilitate the fault tolerance by checking the availability of the individual segmentation servers, collect content segments from one of the segmentation servers, and serve the content segment to clients. The caching server automatically checks a primary segmentation server to ensure it is available (e.g., online), and provides automatic failover to a backup segmentation server should the primary server experience a fault (e.g., go offline).

17 Claims, 9 Drawing Sheets

(56) References Cited

U.S. PATENT DOCUMENTS

| | | | |
|---|---|---|---|
| 2009/0182843 A1* | 7/2009 | Hluchyj | H04L 67/2804 709/219 |
| 2011/0080940 A1 | 4/2011 | Bocharov et al. | |
| 2012/0170741 A1* | 7/2012 | Chen | H04L 63/0428 380/210 |
| 2013/0046861 A1 | 2/2013 | Biderman et al. | |
| 2013/0097309 A1* | 4/2013 | Ma | H04L 29/08099 709/224 |
| 2013/0111529 A1* | 5/2013 | Yao | H04N 21/2393 725/93 |
| 2013/0166765 A1* | 6/2013 | Kaufman | H04L 65/4084 709/231 |
| 2014/0280784 A1* | 9/2014 | Moroney | H04L 65/60 709/219 |
| 2016/0191599 A1* | 6/2016 | Stridsman | H04N 21/25841 709/219 |
| 2017/0280178 A1* | 9/2017 | Sun | H04L 47/286 |
| 2017/0332117 A1* | 11/2017 | Haritaoglu | H04N 21/23436 |

* cited by examiner

SYSTEM AND METHOD FOR PROVIDING FAULT TOLERANT STREAMING OF SEGMENTED CONTENT AND CACHE COHERENCY ON MULTI-HOSTED ORIGIN SYSTEMS

BACKGROUND

The internet provides a novel way for the streaming of live video/television streams, which allows for a much more interactive viewing experience, as compared to older, more traditional, one-way forms of video delivery. One challenge, in internet delivery, is to provide a system of streaming segmented content that includes built in fault tolerance, so that the failure of a single server does not lead to an interruption of the availability of the streams from that server. Segmented streams of content are particularly useful for live streaming of content.

HTTP Live Streaming (HLS) is one method of streaming segmented content for both live streams, and pre-recorded content. Other adaptive bitrate standards that deliver segmented content include MPEG-DASH, HTTP Dynamic Streaming (HDS), HTTP Smooth Streaming (HSS), and others. Live streams may be delivered via multicast in the MPEG-2 Transport Stream streaming format or other streaming formats. To convert to HLS or other adaptive bitrate standard, a segmentation-server may ingest the content stream, such as pre-recorded content or a live streamed MPEG-2 Transport stream, and output segments and a playlist, according to the respective adaptive bitrate standard. Other content sources may feed the segmentation server for pre-recorded content.

For the purpose of this disclosure, the terms segments, chunks, and fragments are used interchangeably throughout and refer to a portion of a content stream (e.g., one to ten seconds of an MPEG-2 Transport stream). Likewise, the terms playlist and manifest are used interchangeably throughout and refer to a file that lists out all of the available segments and decryption keys for a content stream and a location (e.g., URL) for each of the segments and/or keys where a client device may access the respective segment/key. During playback, a client may access, buffer, and play back the segments in the playlist in sequence. For live-streams, the playlist is updated in real time, with newly available stream segments continually being appended to the end of the playlist, and older segments being removed from the beginning of the playlist. The client device requests updated playlists from the server at periodic intervals. When the client device receives a playlist containing a new segment, it will then schedule that segment for download and playback. To facilitate content protection, the segments may be encrypted and URLs to the decryption keys are placed into the playlist. The client is authenticated with a key delivery server to ensure it is entitled to access the content. Usually a decryption key is valid for a period of time (e.g. 60 minutes), which is a parameter supplied to the segmentation server. The playlist file contains a URL to request the required key to decrypt the segments listed. If a key change occurs, the playlist indicates which segments use the old decryption key, and which segments use the new key. The key delivery server will then supply requested decryption keys to the client, provided the client is authorized to receive them.

There are two traditional architectures discussed below for the creation and serving of segmented content streams. In a first architecture, an encoder outputs the content stream via a traditional multicast delivery. A segmentation server (e.g., an HLS segmentation server) joins the multicast group, receives the content stream, and converts the received content stream into segments (e.g., HLS chunks, according to the HLS specification and user settings). The segmentation server also creates a playlist for the content stream. If the segments are to be protected, the segmentation server may also obtain encryption keys for the segments and encrypt each of the segments. The segmentation server may also append URLs to the decryption keys in the playlist. The segmentation-server (e.g., HLS or other adaptive bit rate standard segmentation server) may host a web server, or a web server may reside on a third server. In either case, the web server serves the segments out to various client devices over the internet, as needed for playback of the content stream.

In a second architecture, the encoder directly produces the segments (e.g., HLS chunks), optionally encrypts the segments, produces a playlist, and appends URLs to the decryption keys. The output of the encoder is then uploaded to a web server, which then serves the segments out to various client devices over the internet for playback.

If the segmentation server in the first architecture or the encoder in the second architecture fails, then the stream will go down. In other words, a single server failure will bring down the content stream to a client. Some of the adaptive bit rate standards do provide a way to achieve some degree of fault tolerance. For example, in the HLS standard, a "master" or "variant" playlist can list URLs to streams at different IP addresses. An HLS client can use the information in the variant playlist to automatically switch from one web server to another if the request for a stream segment fails, i.e. returns an error, or times out. The HLS specification requires that each web server has the exact same segment numbers, segment contents, and also that the same encryption keys are used.

SUMMARY

Aspects of the disclosure provide a fault tolerant system for streaming content to client devices. The system comprises a first segmentation server configured to receive a content stream from a content source, segment the content stream into a set of segments, and generate a playlist. The playlist comprises a list of the set of segments for the content stream and a location for each of the segments in the set of segments. The system also comprises a second segmentation server configured to receive the content stream from the content source, segment the content stream into a second set of segments, and generate a second playlist. The second playlist comprises a second list of the set of second segments for the content stream and a location for each of the segments in the second set of segments. The second set of segments are the same as the set of segments.

In some aspects, the first segmentation server is further configured to generate a variant playlist that contains a list of member stream playlists available for the content stream, including the playlist. The variant playlist includes a location of where the member stream playlists can be retrieved and an optional set of alternate locations where the member stream playlists can be retrieved.

In some aspects, the system further comprises a key server in communication with the first segmentation server and the second segmentation server. The key server is configured to generate a first encryption key in response to receiving a request from the first segmentation server comprising a first segment offset and a content stream name of the content stream. The key server is further configured to generate a second encryption key in response to receiving a request from the second segmentation server comprising the first segment offset and the content stream name of the content stream. The first encryption key is the same as the second encryption key.

In some aspects, the first segmentation server is further configured to encrypt a first segment in the set of segments corresponding to the first segment offset using the first encryption key, and the second segmentation server is further configured to encrypt a first segment in the second set of segments corresponding to the first segment offset using the second encryption key.

In some aspects, the first segmentation server is further configured to receive a request from a client device for a segment in the set of segments, the first segmentation server further configured to provide the requested segment in the set of segments. The second segmentation server is further configured to receive a request from the client device for the segment in the second set of segments when the first segmentation server is not available, the second segmentation server configured to provide the requested segment in the second set of segments.

In some aspects, the system further comprises a caching server configured to pass the request from the client device for the segment in the set of segments to the first segmentation server. The caching server is further configured to periodically probe the first segmentation server and verify whether the first segmentation server is available in response to the periodic probe. The caching server is further configured to pass the request for the segment to the second segmentation server in response to a determination that the first segmentation server is unavailable.

In another aspect of the disclosure, a fault tolerant system for streaming content to client devices is provided. The fault tolerant system comprises a first segmentation server configured to receive a content stream from a content source, segment the content stream into a set of segments, and generate a playlist. The playlist comprises a list of the set of segments for the content stream and a location for each of the segments in the set of segments. A second segmentation server configured to receive the content stream from the content source, segment the content stream into a second set of segments, and generate a second playlist. The second playlist comprises a second list of the set of second segments for the content stream and a location for each of the segments in the second set of segments. A caching server in communication with the first segmentation server and the second segmentation server, the caching server configured to receive a request for a requested segment and pass the request for the requested segment to the first segmentation server or the second segmentation server.

In some aspects, the second set of segments are the same as the set of segments.

In some aspects, the caching server is further configured to periodically probe the first segmentation server and verify whether the first segmentation server is available in response to the periodic probe.

In some aspects, the caching server is configured to pass the request for the requested segment to the first segmentation server based on a determination that the first segmentation server is available in response to the periodic probe.

In some aspects, the caching server is further configured to pass the request for the requested segment to the second segmentation server based on a determination that the first segmentation server is unavailable in response to the periodic probe.

In some aspects, the caching server is further configured to periodically probe the second segmentation server and verify whether the second segmentation server is available in response to the periodic probe.

In some aspects, the first segmentation server is further configured to receive a first encryption key from a key server in response to a request for the first encryption key, wherein the first segmentation server is configured to encrypt a segment in the set of segments with the first encryption key. The second segmentation server is further configured to receive the first encryption key from the key server in response to a second request for the first encryption key, wherein the second segmentation server is configured to encrypt a second segment in the second set of segments with the first encryption key.

In some aspects, the request for the first encryption key comprises a first segment offset corresponding to the segment in the set of segments and the second request for the first encryption key comprises a second segment offset corresponding to the second segment in the second set of segments. The first segment offset is the same as the second segment offset.

In some aspects, the request for the first encryption key and the second request for the first encryption key further comprises a stream name of the content.

In some aspects, the first segmentation server is configured to segment the content stream into the set of segments in accordance with an adaptive bitrate standard selected from the group consisting of HTTP Live Streaming, MPEG-DASH, HTTP Dynamic Streaming, and HTTP Smooth Streaming.

In some aspects, fault tolerant system further comprises a second caching server in communication with the first segmentation server and the second segmentation server. The second caching server configured to receive the request for the requested segment when the caching server is unavailable. The second caching server is further configured to pass the request for the requested segment to the first segmentation server or the second segmentation server.

These and other features will be more clearly understood from the following detailed description taken in conjunction with the accompanying drawings and claims. Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
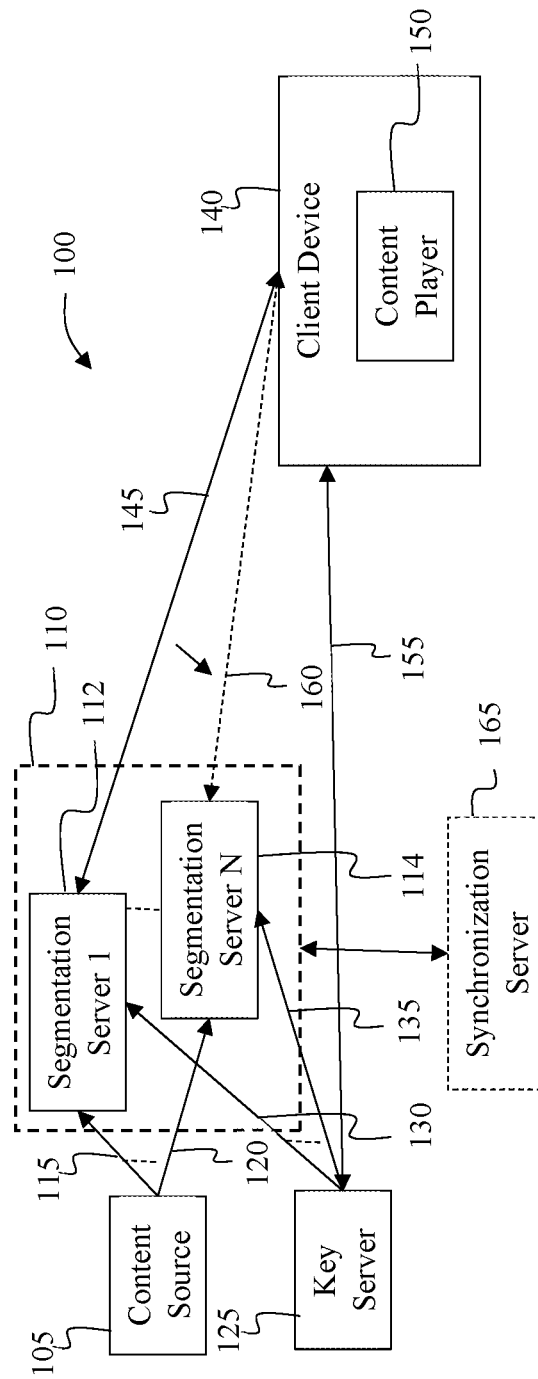
FIG. 1 shows an exemplary segmented stream failover system suitable for implementing various embodiments of the disclosure.

It should be understood at the outset that although illustrative implementations of one or more embodiments are provided below, the disclosed systems and methods may be implemented using any number of techniques, whether currently known or in existence. The disclosure should in no way be limited to the illustrative implementations, drawings, and techniques provided below, but may be modified within the scope of the appended claims along with their full scope of equivalents.

A drawback in the traditional failover method for segmented content streams is that some clients are not smart enough to make the transition from one web server to another automatically. Another drawback is that if a web server fails, the client would need to wait for the HTTP request for a stream segment to timeout, before it would be able to initiate the request for the segment at another web server. Waiting for the timeout (or possibly a series of timeouts if more than one server is offline), could cause a player on the client device to have an underrun condition where it does not have the next segment for playback available in time for presentation to the user.

Accordingly, disclosed herein is a system of generating and delivering segmented content streams (e.g., HLS video streams from a live source) with fault tolerance. Specifically, multiple segmentation servers are synchronized to provide failover capacity in such a way that should a failover occur, the segment numbers/playlists/encryption keys/decryption keys are identical on each of the segmentation servers. Synchronizing the contents of a segmentation server on one or more backup segmentation servers ensures that the delivery of a content stream is immune to the failure of segmentation servers, provided at least one segmentation server remains fault-free.

A caching server may facilitate the fault tolerance by checking the availability of the individual segmentation servers, collect content segments from one of the segmentation servers, and serve the content segment to clients. The caching server automatically checks a primary segmentation server to ensure it is available (e.g., online), and provides automatic failover to a backup segmentation server should the primary server experience a fault (e.g., go offline). The backup segmentation server will continue to provide the stream segments to clients via the caching server, as if no fault on the primary segmentation server had occurred. In this way, the failure of any of the segmentation servers will not cause any interruption of the content stream to the client.

Moreover, because the logic for failing over from a primary segmentation server to a backup segmentation server resides on the caching server, all client devices can benefit from the fault tolerance provided by the caching server and synchronized segmentation servers.

The automatic detection of segmentation server faults by the caching server improves reliability in the client since a bad server will not need to be detected via the timeout of a request for a stream segment. The caching server can also decrease load on the segmentation servers by storing commonly accessed stream files (e.g., segments and playlists).

In some implementations, more than one caching server may be used. In such implementations, further failover protection is provided against the failure of a caching device.

FIG. 1 shows an exemplary segmented stream failover system 100 suitable for implementing various embodiments of the disclosure. As shown in FIG. 1, the segmented stream failover system 100 includes a content source 105, a group of segmentation servers 110, a key server 125, and a client device 140.

The content source 105 is configured to provide a content stream of a piece of content (e.g., a video stream, audio stream, slideshow stream or other media content stream). In some implementations, the content source 105 may provide a content stream of a pre-recorded piece of content. In some implementations, the content source 105 may encode a live stream piece of content and output a content stream. For example, the content source 105 may encode a video live stream and output an MPEG-2 transport stream of the video (and any audio). Other content types and sources (including, but not limited to the output of an encoder, a transcoder, a satellite broadcast, ATSC broadcast, and Video on Demand (VOD) recordings) are contemplated by this disclosure and readily identifiable by those of ordinary skill in the art.

The content source 105 may also output a plurality content streams for each piece of content, referred to hereinafter as a stream group. Each of the output content streams for a specified piece of content, referred to as a member of the stream group or member stream, may be set to a specified bit rate, resolution, or other parameter specified in a corresponding content streaming profile. The stream clocks on each of the plurality of output content streams are in sync, and ideally video key frames (e.g., I-frames) occur at the same time in each. More than one content source 105 may be present in various implementations.

The content stream(s) output from the content source 105 are received by the group of segmentation servers 110. The group of segmentation servers 110 includes two or more segmentation servers so as to provide segmentation server failover protection. As shown, the group of segmentation servers 110 includes a first segmentation server 112 and an Nth segmentation server 114. The Nth segmentation server 114 may alternatively be referenced as a second segmentation server 114 or a failover segmentation server 114 throughout this disclosure.

The segmentation servers 110 receive the content stream(s) from the content source 105 over respective communication pathways. For example, the first segmentation server 112 may receive content stream(s) from the content source 105 via a communication pathway 115. Similarly, the Nth segmentation server 114 may receive content stream(s) from the content source 105 via communication pathway 120. Throughout this disclosure, each communication pathway described herein may span one or more networks, such as local area network(s), metropolitan area network(s) (MAN), and wide area network(s) (WAN), the internet or other such networks, over one or more transmission mediums, such as wired or wireless (e.g., optical or electromagnetic) communication transmission mediums, using one or more information communication standards (e.g., IEEE 802 standards, SONET, SDH, ATM, etc.).

Each of the segmentation servers in the group of segmentation servers 110 is configured to receive the content stream from the content source 105, segment the content stream into a set of segments, and generate a playlist that lists the set of segments in an order of playback for the content. For example, each of the segmentation servers 110 may join a multicast group for a live stream content stream and receive the live content stream. When more than one content stream is received for a single piece of content (e.g., content streams of varying bit rates), a separate set of segments is generated for each content stream received by the respective segmentation server. In other words, a separate playlist is generated by the segmentation servers 110 for each member of a stream group. The playlist for a given member of a stream group is referred to as a member stream playlist. Each member stream playlist that is generated lists the set of segments for the given member stream in the order of playback for the member stream. The segmentation servers 110 also generate a master, or variant playlist which contains a list of all such member stream playlists (at varying bitrates, resolutions, codecs, etc.) available for the content of the member stream. The master playlist defines the location (e.g., the URL) where the member stream playlists can be retrieved, an optional set of alternate locations where the member stream playlists can be retrieved, and also the stream parameters for each member stream. The segmentation servers in the group of segmentation servers 110 may operate in accordance with one or more standards for streaming variable bit rate content streams, such as HLS, MPEG-DASH, HDS, HSS, or other web based segmented content delivery standards.

Each segmentation server 110 generates an identical set of stream segments for a given content stream. For a failure of one of the segmentation servers 110 to not affect playback of the content stream on a client device, the content streams and the set of stream segments provided by different ones of the segmentation servers 110 are identical in content, and have the same filenames. This is true whether the segmentation servers 110 are located in one physical location, or in server-rooms in different physical locations. There are two different types of streams. One is for live broadcasts, and the other is for recordings (i.e. for remote storage Digital Video Recorder (DVR) recordings).

A playback clock (i.e. the Mpeg-2 Transport Stream's PCR clock) may be provided with the content stream received by the segmentation servers 110. The segmentation servers 110 use the playback clock to segment the stream at the same point on each of the segmentation server 110. A configuration parameter of the segmentation servers 110 is the target segment duration. A new segment is triggered when:

$$\text{floor}\left(\frac{C_N}{D}\right) - \text{floor}\left(\frac{C_{N-1}}{D}\right) = 1, \quad \text{equation (1)}$$

where $C_N$ is the playback clock at time N, $C_{N-1}$ is the playback clock a time N-1, and D is the target segment duration configured on the segmentation servers 110. Upon a new segment being triggered, the segmentation servers 110 will start a new segment on the next key frame (e.g., I-frame) in the content stream. This will result in identical breaks in the set of segments generated by each of the segmentation servers 110 because the playback clock and the location of the I-frames will be identical for each content stream received by the content servers 110. The segmentation servers 110 will also be triggered to cause the segments to break at the exact same spot for each member stream in a stream group because the playback clock in each member stream will match and the I-frames for each member stream will also line up.

In addition to breaking the content stream into segments at the same point, the segmentation servers 110 also create identical segmentation numbers for each segment of the content stream. In creating identical segment numbers, or segment offsets, for the segments of the content streams, there are two cases. The first is the live stream case, and the second is the recording case.

In the live stream case, two methods are described herein to compute a segment number, S, of a given segment, ensuring that the computation will give the same result regardless of which segmentation server the computation is being performed on. The first method assumes that each packet in a content stream arrives at each of the segmentation servers 110 at the same wall clock time (e.g., standard time set outside of the segmented stream failover system 100, such as GMT, TAI, UTC, etc.). The second method will produce identical segment numbers, even if the communication pathway between the content source 105 (e.g., an encoder) to segmentation servers 110 causes arbitrary delays in the arrival of stream packets from the content source 105 (including delays in the input packet arrival to the encoder). The first method provides synchronized segmentation numbers without requiring any external communication with a synchronization server 165. In the second method, a synchronization server 165 aids in the synchronization process. In either case, the computation provided may occasionally cause segment numbers to skip a number. If a segment number is skipped the segmentation servers 110 create a minimal segment (e.g., for HLS, an MPEG2 Transport Stream file could be created containing just the stream PAT and PMT) to fill in the missing segment numbers. If the formula below causes the segmentation servers 110 to produce the same segment number for two segments, the segments will be joined, creating an extra-large segment.

As mentioned, the first method of generating segment numbers assumes that the input packets arrive at the various segmentation servers at the same wall clock time. This condition is likely only true if all the segmentation servers co-exist in the same physical location, and use the same communication network. The segment numbers are computed by the segmentation servers 110 by:

$$S = \text{floor}\left(\frac{W}{D}\right), \quad \text{equation 2}$$

where S is the segment number computed by the segmentation servers 110, W is the Wall Clock time (e.g., in GMT as measured since a fixed epoch in the past, such as Jan. 1, 2014 at 00 h00 GMT), and D is the target segment duration. The fixed epoch from which the Wall Clock time is measured and the target segment duration are parameters configured on the segmentation servers 110. In some implementations, C, W, and D are measured in units of a 90 khz clock (which is common in MPEG2 Transport Streams). Using this formula, and assuming that the wall clocks on every server are synchronized (e.g., using the Network Time Protocol, NTP), will result in identical segment numbers being computed on each of the segmentation servers 110.

The second method of generating segment numbers is more generally applicable, but to ensure that each of the segmentation servers 110 produces the same segment number for the same set of data comprising the stream segment, a segment synchronization server 165 is used. Each of the segmentation servers 110 will communicate with the segment synchronization server 165 over a communication pathway. The segment synchronization server 165 may co-exist on the same physical server as one or more of the segmentations servers 110.

A given one of the segmentation servers 110 receives the content stream until the point at which the content stream will be divided and a new segment is created, as described above. At each divide point, the given one of the segmentation servers 110 will know the playback clock time, C, (e.g., the PCR clock in an MPEG2 Transport Stream). The given one of the segmentation servers 110 sends a request over a communication pathway to the segment synchronization server 165 including the content stream ID, the playback clock time, and a flag indicating if the given one of the segmentation servers 110 is a master segmentation server for the content stream. The segment synchronization server 165 returns a current stream epoch count, a stream clock value, and whether this segmentation server is to become the master segmentation server for the stream (e.g., if it is the first of the segmentation servers 110 to report to the segment synchronization server 165, or if the previous one of the segmentation servers 110 marked as the master segmentation server went offline). The one of the segmentation servers 110 that is marked to be the master segmentation server for the content stream sends a message to the segment synchronization server 165 reporting the playback clock time each time a new segment is created. If the given one of the segmentation servers 110 is not the master segmentation server for the stream, a request will be made to the segment synchronization server 165 before the first segment is created, and subsequently after a group of segments, the size of which is a parameter to the segmentation server (i.e. after 10 segments), to check if the master segmentation server has gone offline. The given one of the segmentation servers 110, in the latter case receives a reply from the segment synchronization server 165. If the reply has the flag indicating that the given one of the segmentation servers 110 should become the master segmentation server for this stream, then the segmentation server makes itself into the master segmentation server after this point, and changes the frequency of updates provided to the segment synchronization server.

The stream epoch count returned by the segment synchronization server 165 is the number of times the stream clock would have wrapped intervals since a specific epoch in the past (i.e. since for MPEG2 Transport Streams, the clock wraps every 26 hours, 30 minutes and 43.7 seconds, the epoch count returned would be the number of 26 h30 m43.7 s intervals that have occurred between now and a fixed epoch in the past). Using the returned epoch count, the segmentation servers 110 compute the segment numbers using:

if $P_r > W-R$ and $P_l < R$, then $E=E+1$ if $P_r < R$ and $P_l > W-R$, then $E=E-1$ $$S = \text{floor}((E*W+P_l)/D) \qquad \text{equation 3,}$$

where E is the epoch count returned to the segmentation servers 110 by the segment synchronization server 165, $P_r$ is the stream clock returned to the segmentation servers 110 from the segment synchronization server 165, $P_l$ is the local stream playback clock on the segmentation servers 110 at the point where the new segment is being created, R is the wrap window size, D is the target segment duration configured on the segmentation servers 110, and W is the maximum length of time before the returned stream clock, $P_r$, or the local stream playback clock, $P_l$, will wrap around to zero (e.g., 26 hours, 30 minutes and 43.7 seconds for MPEG2 Transport Streams). The wrap window size, R, should be large enough to account for the maximum expected stream transport jitter (e.g., in most cases setting R to 120 seconds would provide a large enough correction window). W, D, R, $P_r$ and $P_l$ are all measured in the same unit of time (e.g., units of a 90 khz clock). The two boundary cases adjust the epoch count prior to computing the segment number. First, if the local stream is ahead of the reference stream, and the local stream's clock has wrapped, E is increased by one to account for this clock wrap. Second, if the local stream is behind the reference stream, and the reference stream's clock has wrapped, then E is decreased by one to account for the clock wrap on the reference stream.

The segmentation servers 110 continue to use the value of E for the epoch count, until the clock in the local stream being segmented wraps around from the largest possible value to a value close to 0. When a local wrap event is detected, E is increased by one, and S is computed using the formula above.

The segment synchronization server 165 maintains a database of streams, identified by the stream ID. The segment synchronization server 165 receives a message from a given one of the segmentation servers 110 containing a stream ID, and the local stream playback clock, $P_l$ (e.g. the PCR clock in an MPEG 2 TS stream). There are two cases, either the segment synchronization server 165 does not have a record of the stream ID in its database, or the segment synchronization server 165 does have a record of the stream ID in its database.

In the first case, the segment synchronization server 165 does not currently have a record of a stream with the received stream ID. The segment synchronization server 165 will create a new entry in the database. In this case, the current epoch count, E, is computed by the segment synchronization server 165 using:

$$E = \text{floor}(C/W) \qquad \text{equation 4,}$$

where C is a measure of wall-clock time since a fixed epoch in the past (the fixed epoch is a configuration parameter of the segment synchronization server 165), and W is the maximum length of time before the clock will wrap around to zero (e.g., 26 hours, 30 minutes, and 43.7 seconds for MPEG2 Transport Streams). The segment synchronization server 165 will store a new entry in its database with the stream ID, the received local stream playback clock, $P_l$, and the computed value of E. Finally, the segment synchronization server 165 will return a message back to the given one of the segmentation servers 110 over a communication pathway with the epoch count E, the received local stream playback clock, $P_l$, and a flag indicating that the given one of the segmentation servers 110 is the first to report this particular stream ID and thus is the master synchronization server.

In the second case, the segment synchronization server 165 has a record of a stream with the requested stream ID. The segment synchronization server 165 looks up the record in the database for the stream with the requested stream ID. If the request received indicates that this message is from the master segmentation server, then the clock value record for the stream is updated to the new clock value in the request. If the clock value in the request indicates a clock wrap event has occurred, the epoch count in the record for the stream ID is also increased. Finally, the segment synchronization server 165 returns the standard reply including the stream clock from request, the epoch count stored in the stream record, and a flag indicating that this server is the master segmentation server.

If the request indicates that this message is not from the master segmentation server (and the segment synchronization server 165 has a record of the stream), then the segment synchronization server 165 retrieves the record for the stream from its database. The segment synchronization server 165 returns the clock value, epoch count from the retrieved record, and a flag indicating that the given one of the segmentation servers 110 is not the master segmentation server. If the record for the stream indicates that the stream has no master segmentation server, then the segment synchronization server 165 will set the flag in the reply to the requesting segmentation server, indicating that it should become the master segmentation server for the stream.

Periodically, the segment synchronization server 165 will go through its database and check all the streams to determine which streams, if any, have not been updated for a period of time, which is a parameter to the segment synchronization server 165 (e.g. a stream record not having received an update for 120 seconds). For each stream that has not received an update, a flag is set in the record indicating that the stream has no master segmentation server. When the next request from a given one of the segmentation servers 110 is received by the segment synchronization server 165, this flag will be checked, and if set, the given one of the segmentation servers 110 will be instructed to become the master synchronization server for the stream.

Using the method described will guarantee that the segment numbers produced by each segmentation server for a particular live stream will be identical.

In the case of a recorded content stream, segment number S is computed using:

if $C<H/2$, then $W_0=H$ if $C>H/2$, then $W_0=0$ $$S=\text{floor}((W_0+C)/D) \quad \text{equation 5,}$$

where C is the playback clock (e.g., PCR), D is the target segment duration, $W_0$ is a uniform reference point in the past that is identical on all of the segmentation servers 110 for a particular recorded content stream (e.g., the Wall Clock time in GMT measured in milliseconds since a fixed time in the past, such as Jan. 1, 2014 at 00 h00 GMT, but any time will do so long as all of the segmentation servers 110 use the same point), and H is a wrap point of the playback clock C. The times of C, $W_0$, and D are measured in milliseconds. If the playback clock, C, does not ever wrap, then H can be set to zero so that $W_0$ would likewise be set to zero. The reason for having a different $W_0$ based on the current clock is to allow for the fact that different customers may cause the segmentation servers to initiate a recording at differing start times. If a recording starts just before the playback clock wraps on a first one of the segmentation servers 110, and just after the playback clock wraps on a second one of the segmentation servers 110, identical segment numbers will still be computed on all of the segmentation servers 110. Using this formula, will result in identical segment numbers being computed on each independent ones of the segmentation servers 110 for a recorded stream.

Each of the segmentation servers 110 generates the playlists listing all the stream segments, and because the algorithm as defined above produces identical segment sizes, and segment numbers, the resulting playlists from each of the segmentation servers 110 will be identical. The playlists may either list multiple addresses (of different ones of the segmentation servers 110) for each segment in the stream, or the playlist may point the client device 140 to a DNS name for the caching server 405. This way the client device 140 does not need to be aware of which of the segmentation servers 110 is supplying its stream data. In addition, multiple A-records can be configured for the DNS lookup for the caching server 405 to allow for multiple failover caching servers.

For streams being delivered by Mpeg 2 Transport Streams, if two or more content sources are providing the same stream to two different ones of the segmentation servers 110, the content sources must provide streams with the same GOP structure (i.e. the assignment of which frames are Intra predicted, Forward-Predicted, and Bi-Directional Predicted frames), and PTS/DTS clocks. However, most communication mediums require Mpeg 2 Transport Streams to be delivered using a constant bitrate, where for every small period of time, the number of bits being transported is fixed. This constant bitrate encoding is achieved using CBR multiplexing of the stream into the Mpeg 2 Transport Stream format. Since the component video and, in some cases, audio streams are inherently variable in bitrate, the constant output rate is achieved by using a buffering technique where null packets are sometimes inserted, and the time difference between the PCR and PTS/DTS clocks varies over time. Because the content sources outputting the stream are not communicating, there is no way of determining the current state of CBR buffer of the other content sources. Without making changes to the CBR streams from two or more content sources, the buffers at any point in time will be different, and as a result the output streams will not be identical. If the segmentation servers 110 made segments from the two content sources without processing the output, the resulting segments would not be identical.

The solution to this is a process where the input stream to a given one of the segmentation servers 110 is first demultiplexed into its component streams. At this point, each of the segmentation servers 110 will have a list of video and audio frames with their associated PTS and DTS clocks. The segmentation servers 110 will then multiplex the streams into a Mpeg 2 Transport Stream using variable bit rate (VBR) multiplexing. With VBR multiplexing the PCR clock is set to have a fixed difference between the DTS clock of either the video or audio track. The segmentation servers 110 have parameters specifying the desired difference between the DTS and the PCR clock, and also which stream should be used as a basis for the clock. Once the stream has been multiplexed into a VBR Mpeg 2 Transport Stream, the segmentation servers 110 would then create segments from the re-multiplexed stream, as described above. If each of the segmentation servers 110 has the same parameters, the resulting segments will be identical, in spite of the fact that the input streams have differing buffering characteristics. Even though the resulting segments use VBR multiplexing, the resulting size of each segment will not vary from each other by much. As a result, the transmission time of the resulting segments to the client device will be similar to what they would have been without this re-multiplexing process.

In the implementation shown in FIG. 1, the playlists generated by each of the segmentation servers 110 include a variant playlist. The variant playlist provides a list of member streams within a stream group (e.g., URLs to the same stream at different resolutions, bitrates, or formats). The variant playlist may also contain a set of alternate locations for obtaining each segment in the set of segments in the playlist (e.g., URLs to streams at different IP addresses). For example, the first segmentation server 112 receives a first content stream from the content source 105. The first segmentation server 112 generates a first set of segments and a first playlist with a first set of locations (e.g., URLs) on the first segmentation server 112 for where to access each segment in the first set of segments. At the same time, the Nth segmentation server 114 receives the first content stream from the content source 105 and generates a second set of segments, where the second set of segments are identical to the first set of segments. The Nth segmentation server also generates a second playlist with a second set of locations (e.g., URLs) on the Nth segmentation server for where to access each segment in the second set of segments. The first playlist also includes a variant playlist that includes the second set of locations on the Nth segmentation server for where to access each segment in the second set of segments that correspond to a respective segment in the first set of segments. Similarly, the second playlist includes a variant playlist that includes the first set of locations on the first segmentation server for where to access each segment in the first set of segments that correspond to a respective segment in the second set of segments.

If encryption is desired, when generating the corresponding set of segments and playlist, each segmentation server in the group of segmentation servers 110 will send a request for an encryption key to the key server 125 for each segment in the set of segments. Each request will include a key number, K, for the respective segment in the set of segments and a content stream name. The key number, K, is computed using:

$$K=\text{floor}((S*D_s)/D_k) \qquad \text{equation 6,}$$

where S is the segment number, $D_s$ is the segment duration in milliseconds, and $D_k$ is the key duration in milliseconds (e.g., a typical key duration might be 30 minutes or 2 hours). In some instances, $D_s$ is the same as the target segment duration D. In response to each request, the corresponding segmentation server will receive a reply from key server 125 that includes an encryption key and a location (e.g., URL) for obtaining a decryption key. The requests and replies may be exchanged between the segmentation servers 110 and the key server 125 over respective communication pathways. For example, the first segmentation server 112 may communicate with the key server 125 over communication pathway 130. Likewise, the Nth segmentation server 114 may communicate with the key server 125 over communication pathway 135.

The key server 125 will provide identical encryption keys and locations for obtaining a decryption key to different segmentation servers 110 when the segmentation servers 110 use the same key number and content stream name in their respective requests. The segmentation servers 110 will in turn encrypt the respective segment in the set of segments using the received encryption key and add the location for obtaining the decryption key to the playlist in association with the location for the respective segment.

For example, the first segmentation server 112 will send a request for an encryption key to the key server 125 for a first segment in the first set of segments. The request will include a key number computed based on the segment number for the first segment and a content stream name. The first segmentation server 112 will receive a reply from the key server 125 that includes a first encryption key and a location for obtaining a first decryption key for decrypting content that is encrypted by the first encryption key. The first segmentation server 112 will encrypt the first segment using the first encryption key and add the location for obtaining the first decryption key to the first playlist in association with the location for obtaining the first segment in the first set of segments.

An example playlist file structure is shown below:

```
#EXTM3U
#EXT-X-TARGETDURATION:5
#EXT-X-MEDIA-SEQUENCE:32413258
#EXT-X-KEY:METHOD=AES-128,URI=http_://
caching-server.com/hls/ins__h__network__channel__270110.yek
#EXTINF:2.67,
http_://caching-server.com/hls/ins__h__network__channel__32413258.ts
#EXTINF:4.00,
http_://caching-server.com/hls/ins__h__network__channel__32413259.ts
#EXTINF:2.67,
http_://caching-server.com/hls/ins__h__network__channel__32413260.ts
#EXTINF:4.00,
http_://caching-server.com/hls/ins__h__network__channel__32413261.ts
#EXTINF:2.67,
http_://caching-server.com/hls/ins__h__network__channel__32413262.ts
#EXTINF:4.00,
http_://caching-server.com/hls/ins__h__network__channel__32413263.ts
#EXTINF:2.67,
http_://caching-server.com/hls/ins__h__network__channel__32413264.ts
```

Similarly, the Nth segmentation server 114 will send a request for an encryption key to the key server 125 for a first segment in the second set of segments. The request will include a key number computed based on the segment number for the first segment in the second set of segments and the content stream name. The first segment in the second set of segments is identical to the first segment in the first set of segments. Accordingly, the first offset for the first segment in the second set of segments is the same as the first offset for the first segment in the first set of segments. Because the same segment offset and content stream name is provided to the key server 125 by the first segmentation server 112 and the Nth segmentation server 114, the key server 125 will return an identical encryption key and location for a decryption key to both the first segmentation server 112 and the Nth segmentation server 114. The Nth segmentation server 114 will receive a reply from the key server 125 that includes a second encryption key, which is identical to the first encryption key, and a location for obtaining a second decryption key for decrypting content that is encrypted by the second encryption key, the second decryption key is identical to the first decryption key. The Nth segmentation server 114 will encrypt the first segment in the second set of segments using the second encryption key and add the location for obtaining the second decryption key to the second playlist in association with the location for obtaining the first segment in the second set of segments.

Each segmentation server in the group of segmentation servers 110 may host a web server configured to serve the segments and playlists generated by the respective segmentation server. Alternatively, in some implementations, each segmentation server in the group of segmentation servers 110 may provide the segments and playlists generated by the respective segmentation server to a respective web server (not shown), which in turn serves the segments and playlists to client devices. For example, the first segmentation server 112 may provide the segments and playlists generated by the first segmentation server 112 to a first web server (not shown) for service to client devices. Similarly, the Nth segmentation server 112 may provide the segments and playlists generated by the Nth segmentation server 114 to an Nth web server (not shown) for service to client devices. Regardless of how the segments and playlists are served, the client device 140 may communicate over a communication pathway 145 to request and receive a requested playlist and segments listed in the requested playlist for playback via a content player 150 on the client device 140.

Figure 2:
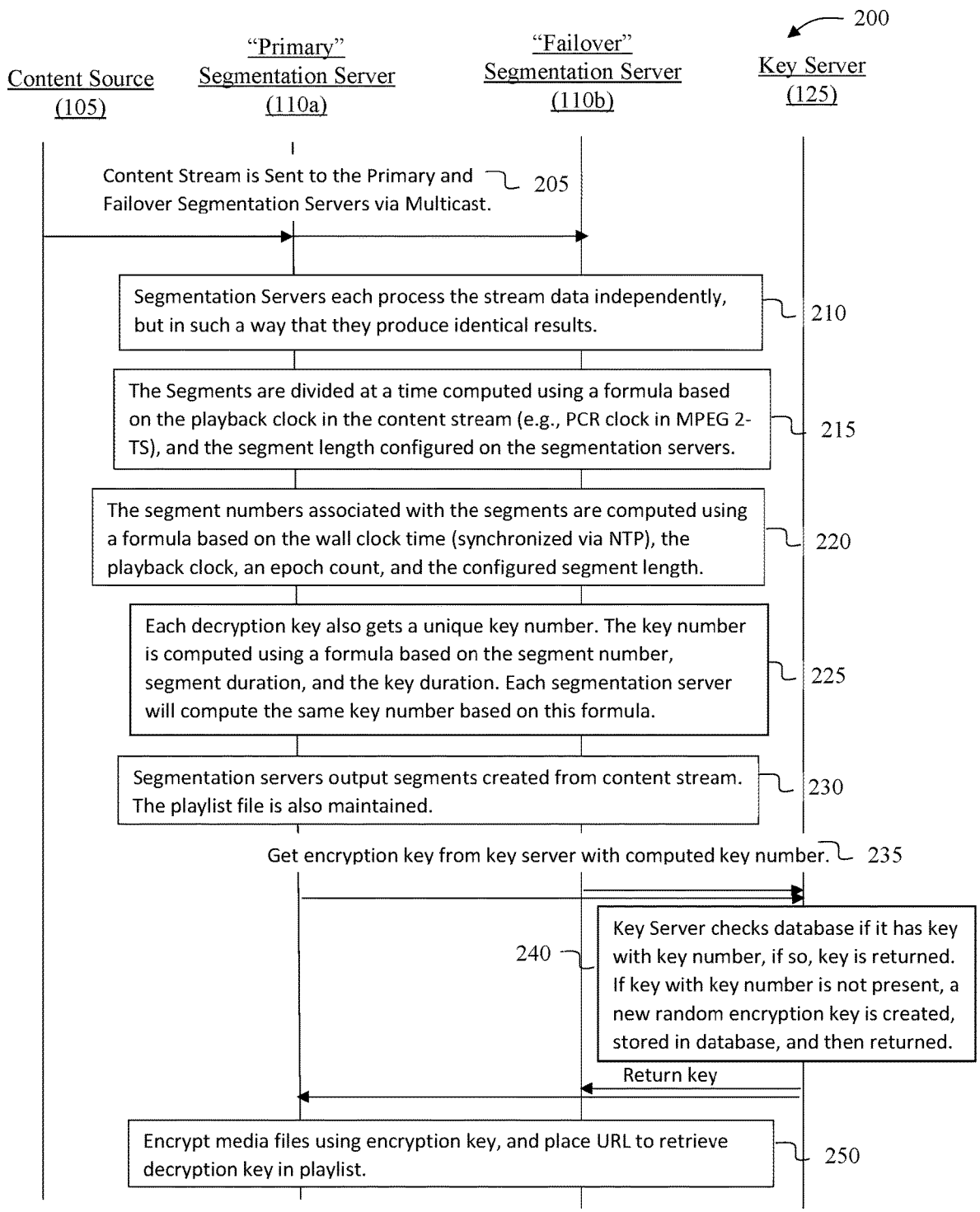
FIG. 2 shows an exemplary sequence diagram for facilitating the synchronization of the segmentation servers according to various embodiments of the disclosure.

FIG. 2 shows an exemplary sequence diagram 200 for facilitating the synchronization of the segmentation servers 110 according to various embodiments of the disclosure. At 205, a content stream is sent via multicast and received by the segmentation servers 110, including a primary segmentation server 110a and a failover segmentation server 110b. At 210, the segmentation servers 110 each process the received content stream data independently, but in such a way that they produce identical results. At 215, the content stream is divided into segments at a time computed using a formula based on the playback clock in the content stream (e.g., PCR clock in MPEG 2-TS), and the segment length configured on the segmentation servers, for example as described above. At 220, the segment numbers associated with the segments are computed using a formula based on the wall clock time (synchronized via NTP), the playback clock, an epoch count from a synchronization server, and the configured segment length, for example as described above. At 225, each decryption key also has a unique key number calculated based on the segment number, segment duration, and the key duration, for example as described above. Each of the segmentation servers 110 will compute the same key number based on this formula. At 230, the segmentation servers 110 output segments created from content stream and maintain a playlist file. At 235, the segmentation servers 110 get encryption keys from the key server 125 with computed key numbers. At 240, the key server 125 checks a database if it has key with key number, and if so, the key is returned. If a key with the requested key number is not present in the database, a new random encryption key is created, stored in database, and then returned. At 250, the segmentation servers 110 encrypt media files using the returned encryption key, and place a URL to retrieve a corresponding decryption key in playlist.

Figure 3:
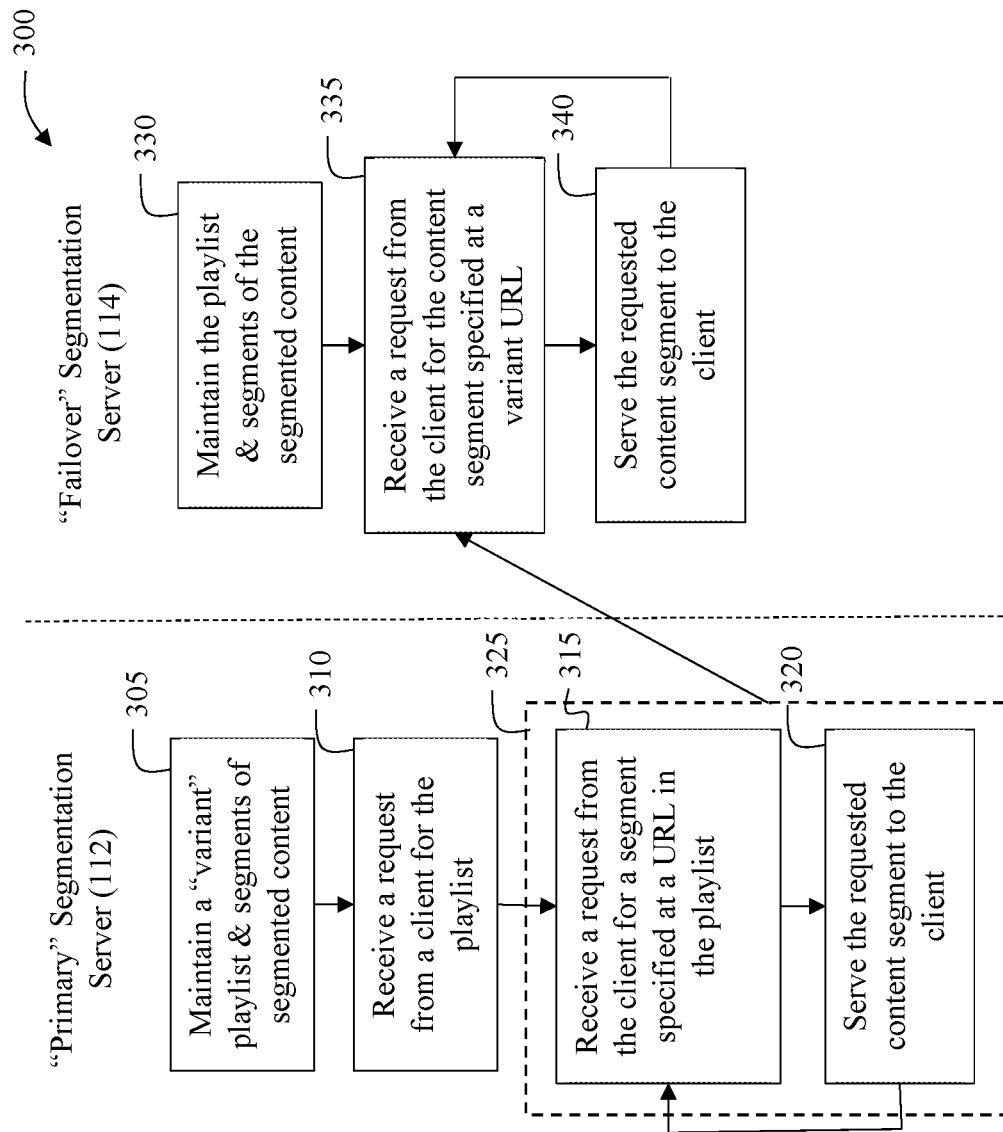
FIG. 3 shows an exemplary process flow for failing over from a primary segmentation server to a failover segmentation server in the system shown in FIG. 1.

FIG. 3 shows an exemplary process flow 300 for failing over from a primary segmentation server to a failover segmentation server in the system shown in FIG. 1. The primary segmentation server may be any of the segmentation servers in the group of segmentation servers 110, such as the first segmentation server 112. The failover segmentation server may be any other of the segmentation servers in the group of segmentation servers 110, such as the Nth segmentation server 114. For the purposes of this example, the primary segmentation server and first segmentation server 112 are referenced interchangeably and the failover segmentation server and the Nth segmentation server are referenced interchangeably.

At step 305, the primary segmentation server 112 (or alternatively a web server in communication with the primary segmentation server 112) maintains a playlist and a set of segments for a segmented content stream (e.g., prerecorded or live-stream). As discussed above, the playlist includes a list of the set of segments as well as corresponding locations (e.g., URLs) for obtaining each of the segments in the set of segments. The playlist also includes corresponding alternate locations for obtaining each of the segments in the set of segments in a "variant" playlist. For example, the variant playlist includes locations on the failover segmentation server 114 for obtaining each of the segments in the set of segments. In some implementations, the playlist may also include corresponding locations for obtaining decryption keys for decrypting encrypted segments in the set of segments.

At step 310, the primary segmentation server 112 (or web server in communication with the primary segmentation server 112) receives a request from a client device 140 for the playlist. The primary segmentation server 112 (or web server in communication with the primary segmentation server 112) in turn serves the requested playlist to the client device 140.

At step 315, the primary segmentation server 112 (or web server in communication with the primary segmentation server 112) receives a request from the client device 140 for a first segment in the set of segments listed in the playlist. The request from the client device 140 includes the segment number of the first segment listed in the playlist. If there is a variant playlist that lists streams at varying bitrates or resolutions, the client device 140 will also determine the maximum bitrate and resolution it can handle based on measurements of its communication pathway, and its video decoding hardware. The client device 140 will request the first segment listed in the playlist which has a bitrate less than the bitrate of the communication pathway and a resolution within the specification of its video decoding hardware. The primary segmentation server 112 (or web server in communication with the primary segmentation server 112) in turn serves the requested first segment to the client device 140 at step 320. Steps 315 and 320 may iteratively repeat so long as the primary segmentation server 112 (or web server in communication with the primary segmentation server 112) remains available to the client device 140 (e.g., remains online with no faults).

At step 325, the client device 140 may determine that the primary segmentation server 112 (or web server in communication with the primary segmentation server 112) is no longer available. For example, a second request, from the client device 140 to the primary segmentation server 112 (or web server in communication with the primary segmentation server 112) for a second segment in the set of segments, may time out or return with a fault.

At step 330, the failover segmentation server 114 (or alternatively a web server in communication with the failover segmentation server 114) maintains a second playlist and a second set of segments for the segmented content stream. The second playlist and the second set of segments may be identical to the playlist and set of segments maintained on the primary segmentation server 112 (or web server in communication with the primary segmentation server 112). The second playlist includes a second list of the second set of segments as well as corresponding locations (e.g., URLs) for obtaining each of the segments in the second set of segments. In some implementations, the playlist may also include corresponding locations for obtaining decryption keys for decrypting encrypted segments in the set of segments.

At step 335, the failover segmentation server 114 (or web server in communication with the failover segmentation server 114) receives a third request from the client device 140 for a second segment in the second set of segments listed in the playlist. The second segment in the second set of segments is identical to the second segment in the set of segments. The third request for the second segment may include the variant location in the playlist corresponding to the second segment. The failover segmentation server 114 (or web server in communication with the failover segmentation server 114) in turn serves the requested second segment to the client device 140 at step 340. Steps 335 and 340 may iteratively repeat so long as the failover segmentation server 114 (or web server in communication with the failover segmentation server 114) remains available to the client device 140 (e.g., remains online with no faults).

Figure 4:
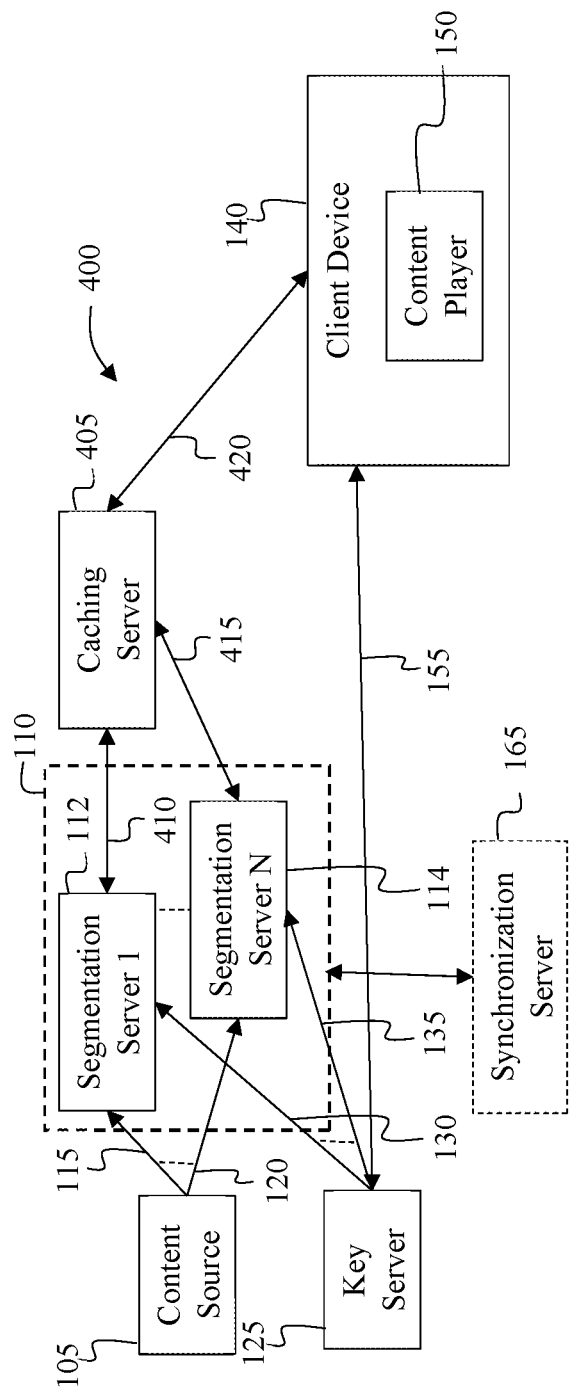
FIG. 4 shows an exemplary segmented stream failover system including a caching server suitable for implementing various embodiments of the disclosure.

FIG. 4 shows an exemplary segmented stream failover system 400 including a caching server 405 suitable for implementing various embodiments of the disclosure. The system 400 includes similar components to the system 100, identified by like reference numbers, the description of which is not repeated herein for clarity. Reference is made to the earlier disclosure of these common components between system 100 and system 400.

As shown in FIG. 4, the segmented stream failover system 400 includes the content source 105, the group of segmentation servers 110, the key server 125, the client device 140, and a caching server 405. Each segmentation server in the group of segmentation servers 110 may operate as discussed above to receive a content stream from the content source 105, segment the content stream into a set of segments, and generate a playlist that lists the set of segments in an order of playback for the content. The segments and playlists generated by each of the segmentation servers in the group of segmentation servers 110 may be synchronized with one another such that identical sets of segments and playlists may be present on more than one segmentation server in the group of segmentation servers 110 to facilitate a failover operation. Moreover, the segmentation servers 110 may cooperate with the key server 125 as discussed above to provide for encrypting and decrypting the generated segments.

The caching server 405 is in communication with each segmentation server in the group of segmentation servers 110 via respective communication pathways. For example, the caching server 405 is in communication with the first segmentation server 112 via a communication pathway 410. The server 405 is in communication with the Nth segmentation server 114 via a communication pathway 415.

In some implementations, a web server may be positioned between each of the segmentation servers in the group of segmentation servers 110 and the caching server 405. For example, a first web server (not shown) may be positioned between the first segmentation server 112 and the caching server 405 and a second web server (not shown) may be positioned between the Nth segmentation server 114 and the caching server 405. The web servers will each receive and store the segments and playlists generated by their respective segmentation server in the group of segmentation servers 110 and respond to requests from the caching server 405 to access the segments and playlists stored therein.

The caching server 405 is further in communication with one or more client devices, such as client device 140 over a communication pathway 420. As discussed in more detail below, the caching server 405 is configured to pass requests and replies between client devices and a primary segmentation server for providing un-cached segments and playlists to the client devices. Passing requests from client devices on to the primary segmentation server is particularly important for live streams, as the contents of the playlist for a live stream is updated frequently, usually every few seconds. If the caching server 405 maintained a cached version of a playlist for a live stream, the client device 140 would not receive an updated playlist and would only be able to play a finite amount of content before terminating.

The caching server 405 may also cache frequently requested segments and playlists for serving directly to client devices without passing requests for the frequently requested segments or playlists on to any of the segmentation servers 110. The caching server 405 may also cache decryption keys for frequently requested segments. Playlists for live streams are typically not cached, or if they are they would only be cached for a few seconds.

The caching server 405 also periodically probes (e.g., once a second) the primary segmentation server to verify that it is still online and accessible to respond to requests. The probe may be a simple web request from the caching server 405 to the primary segmentation server. If the caching server 405 detects that the primary segmentation server is no longer available (e.g., has a fault or is offline), the caching server 405 will automatically start to pass received requests to a failover segmentation server.

The caching server 405 provides for offloading the logic for failing over from a primary segmentation server to a failover segmentation server from client devices—therefore, this system and method of failover is compatible with all client devices. Also, because the caching server periodically probes the primary segmentation server, the caching server 405 is faster at detecting when a segmentation server is no longer available (e.g., has a fault or is offline). In other words, the caching server 405 does not need to wait for a segment or playlist request to time out before initiating failover to another segmentation server. Therefore, the content player on a client device will not experience an under-run condition as a result of a failover between segmentation servers. Rather, the client device 140 will continue to receive segments from the caching server 405 as if no fault had occurred, which is particularly advantageous for live streams.

Figure 5:
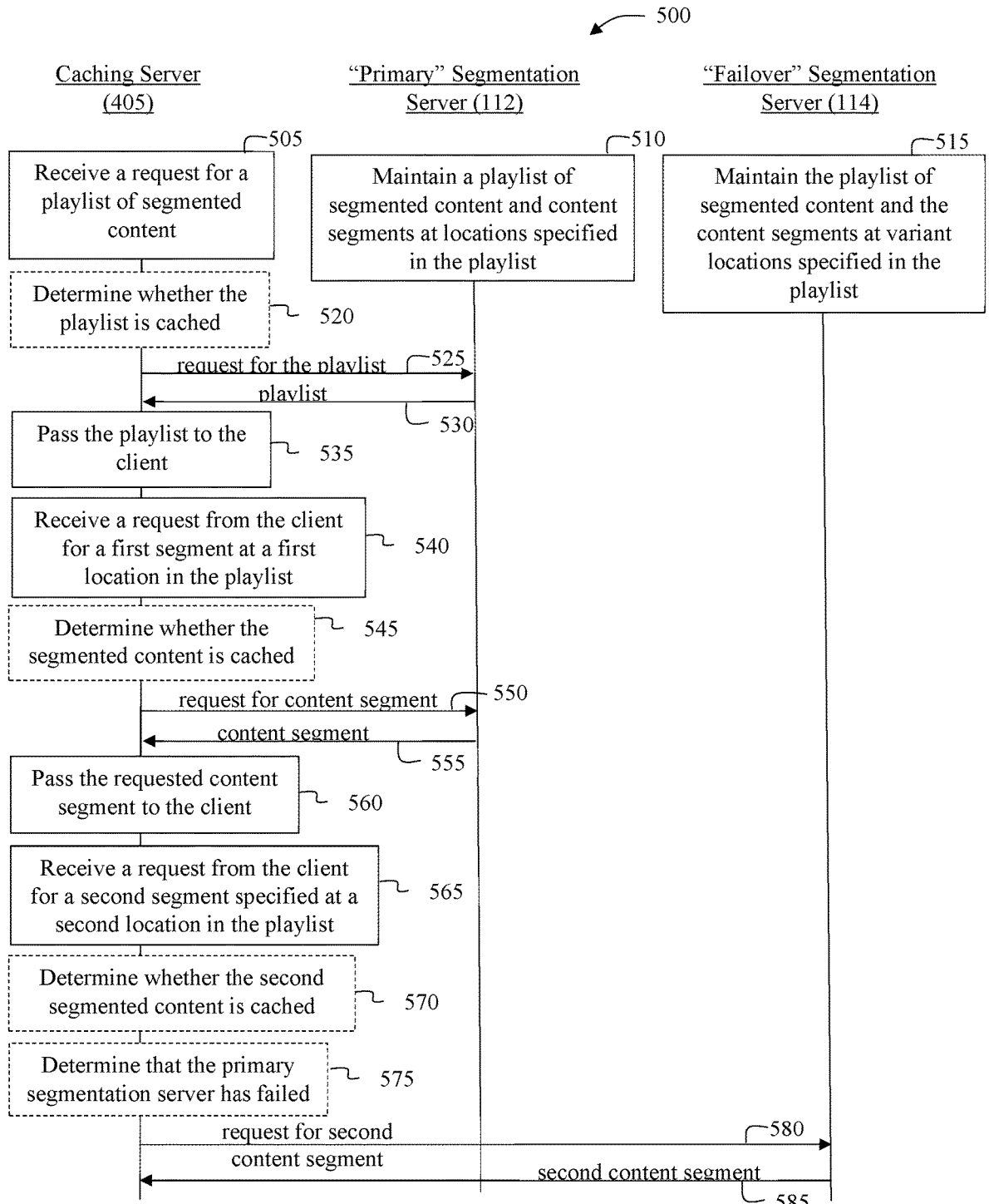
FIG. 5 shows an exemplary sequence diagram for the caching server of FIG. 4 to facilitate a failover from a primary segmentation server to a failover segmentation server.

FIG. 5 shows an exemplary sequence diagram 500 for the caching server 405 of FIG. 4 to facilitate a failover from a primary segmentation server to a failover segmentation server. At step 505, the caching server 405 receives a request from a client device 140 for a playlist of segmented content. At step 510, a primary segmentation server, such as the first segmentation server 112, maintains the playlist and a set of segments listed in the playlist at locations specified in the playlist. Similarly, at step 515, a failover segmentation server, such as the Nth segmentation server 114, also maintains the playlist and the set of segments listed in the playlist at variant locations specified in the playlist.

At step 520, the caching server determines whether the requested playlist is cached on the caching server 405. If so, the caching server 405 returns the requested playlist to the client device 140. If not, the sequence moves on to step 525 where the caching server 405 passes on the request from the client device 140 for the playlist to the primary segmentation server 112. In some implementations, step 520 may be omitted if the caching server 405 does not cache any of the playlists or segments. Typically, for live streams, playlists would only remain in the cache for a few seconds as they are continually being updated. At step 530, the primary segmentation server 112 returns the requested playlist to the caching server 405 which in turn passes the returned playlist on to the client device 140 at step 535. In some implementations, the caching server 405 may re-write the URLs on the playlist before returning the playlist to the client device 140. In this way, the client device 140 may send requests for each of the segments to the caching server 405, which may resolve which segmentation server to obtain the requested segment from.

At step 540, the caching server 405 receives a request for a first segment in a set of segments listed in the playlist at a first location specified in the playlist. At step 545, the caching server 405 determines whether the requested first segment is cached on the caching server 405. If so, the caching server 405 returns the requested first segment to the client device 140. If not, the sequence moves on to step 550 where the caching server 405 passes on the request from the client device 140 for the first segment to the primary segmentation server 112. In some implementations, step 545 may be omitted if the caching server 405 does not cache any of the playlists or segments. At step 555, the primary segmentation server 112 returns the requested first segment to the caching server 405 which in turn passes the returned first segment on to the client device 140 at step 560.

At step 565, the caching server 405 receives a request for a second segment in a set of segments listed in the playlist at a second location specified in the playlist. At step 570, the caching server 405 determines whether the requested second segment is cached on the caching server 405. If so, the caching server 405 returns the requested second segment to the client device 140. If not, the sequence moves on to step 575 where the caching server 405 determines that the primary segmentation server 112 has failed or is otherwise unavailable to fulfill requests for segments or playlists. In some implementations, step 570 may be omitted if the caching server 405 does not cache any of the playlists or segments. At step 580, in response to the determination that the primary segmentation server 112 is unavailable, the caching server 405 examines the playlist and identifies a variant location for the second segment on the failover segmentation server 114. In some implementations, the caching server may be configured with a list of addresses to available segmentation servers which the caching server can use to request the segments/playlists, without requiring analysis of the variants in the playlist. The caching server 405 then passes the request for the second segment to the failover segmentation server 114 at the variant location. At step 585, the failover segmentation server 114 returns the requested second segment to the caching server 405 which in turn passes the returned second segment on to the client device 140. Therefore, the caching server 405 facilitates the failover from the primary segmentation server 112 to the failover segmentation server 114 without any involvement or knowledge on the part of the client device 140.

Figure 6:
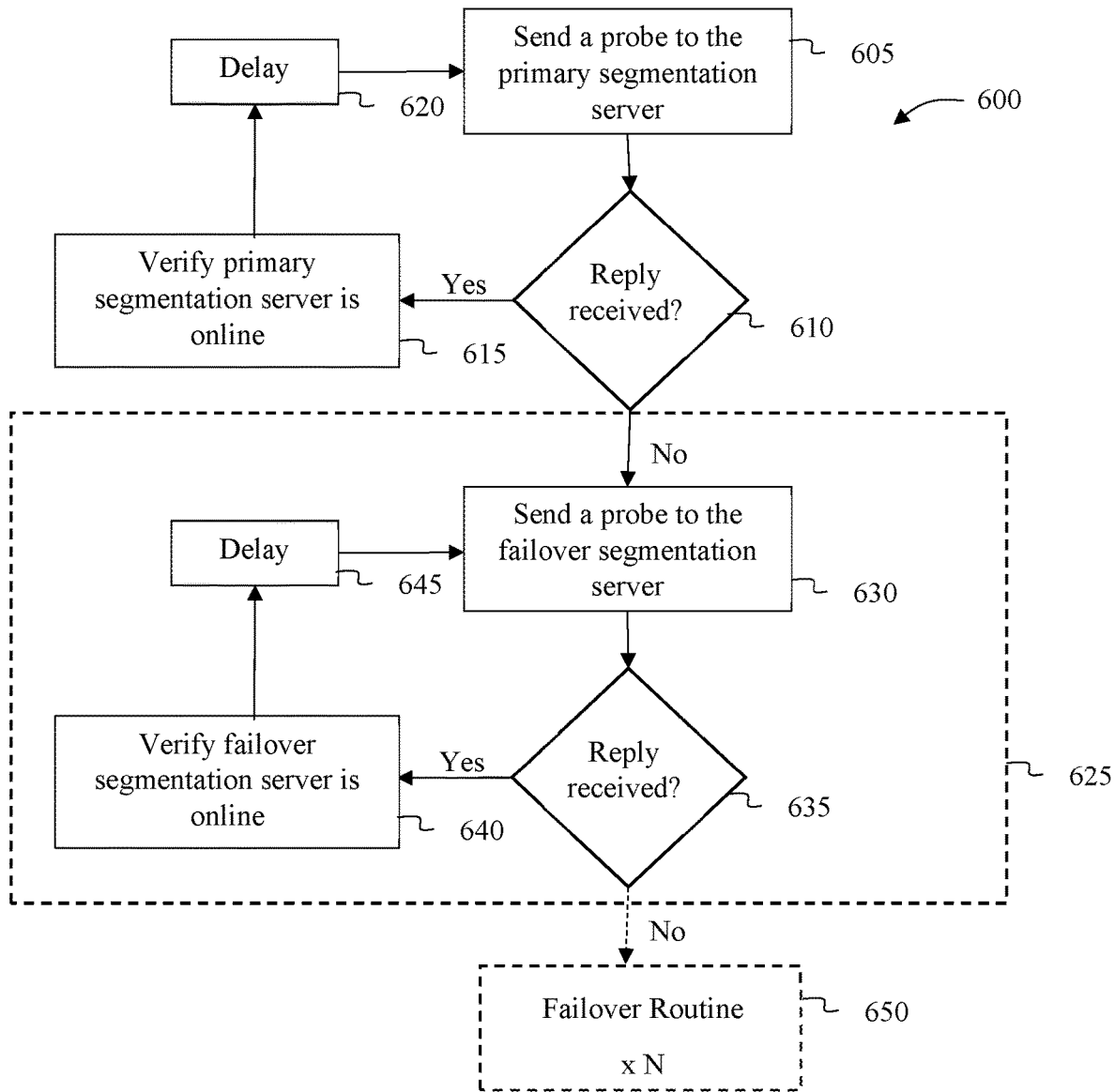
FIG. 6 shows an exemplary process for the caching server of FIG. 4 to detect a fault on a segmentation server.

Step 575 can occur at any point in the sequence diagram 500 and may result as an output of a probing routine that executes in parallel with the normal operations of the caching server 405 to determine availability of the primary segmentation server 112. FIG. 6 shows an exemplary probing routine 600 for the caching server 405 of FIG. 4 to detect a fault on the primary segmentation server 112.

At step 605, the caching server 405 sends a probe to the primary segmentation server 112. The probe may be a simple web request from the caching server 405 to the primary segmentation server 112. At step 610, the caching server 405 determines whether a valid reply has been received from the primary segmentation server 112. If yes, at step 615, the caching server 405 verifies that the primary segmentation server is online and available to process requests. At step 620, the caching server 405 waits for a delay period, such as one second, before proceeding back to step 605 and sending another probe to the primary segmentation server 112. Other delay periods greater than or less than one second are contemplated by this disclosure. In some implementations, the delay period may be omitted.

If at step 610, the caching server 405 determines that a valid reply is not received from the primary segmentation server 112, such as a returned error or no response, the probing routine proceeds to a failover probing routine 625. The failover probing routine starts at step 630 by sending a probe to the failover segmentation server 114. At step 635, the caching server 405 determines whether a valid reply has been received from the failover segmentation server 114. If yes, at step 640, the caching server 405 verifies that the failover segmentation server is online and available to process requests. Any new requests received by the caching server 405 will be passed on to the failover segmentation server 114. At step 645, the caching server 405 waits for a delay period, such as one second, before proceeding back to step 630 and sending another probe to the failover segmentation server 114.

If at step 635, the caching server 405 determines that a valid reply is not received from the failover segmentation server 114, such as a returned error or no response, the probing routine proceeds to a further iteration of the failover probing routine 650 with another segmentation server in the group of segmentation servers 110, assuming there are three or more segmentation servers in the group of segmentation servers 110. This iteration through the failover probing routine may occur for as many segmentation servers as there are in the group of segmentation servers 110 (e.g., N times) until a valid reply is received from a segmentation server or there are no more segmentation servers in the group of segmentation servers 110 to probe. In some implementations, the probing routine 600 will restart and again probe all of the segmentation servers in the group of segmentation servers 110 until a segmentation server provides a valid reply.

Figure 7:
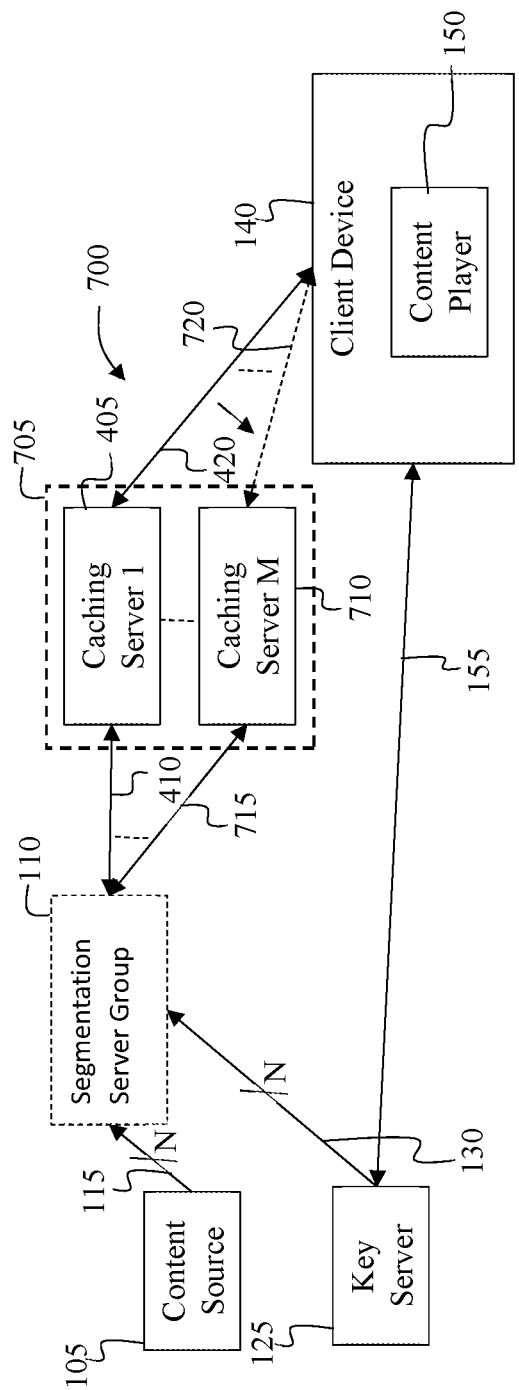
FIG. 7 shows an exemplary segmented stream failover system including a plurality of caching servers suitable for implementing various embodiments of the disclosure.

FIG. 7 shows an exemplary segmented stream failover system 700 including a plurality of caching servers suitable for implementing various embodiments of the disclosure. The system 700 includes similar components to the systems 100 and 400, identified by like reference numbers, the description of which is not repeated herein for clarity. Reference is made to the earlier disclosure of these common components between systems 100 and 400, and system 700.

As shown in FIG. 7, the segmented stream failover system 700 includes the content source 105, the group of segmentation servers 110, the key server 125, the client device 140, and a group of caching servers 705. The group of caching servers 705 includes two or more caching servers, including a first caching server 405 and an Mth caching server 710.

Each segmentation server in the group of segmentation servers 110 may operate as discussed above to receive a content stream from the content source 105, segment the content stream into a set of segments, and generate a playlist that lists the set of segments in an order of playback for the content. The segments and playlists generated by each of the segmentation servers in the group of segmentation servers 110 may be synchronized with one another such that identical sets of segments and playlists may be present on more than one segmentation server in the group of segmentation servers 110 to facilitate a failover operation. Moreover, the segmentation servers 110 may cooperate with the key server 125 as discussed above to provide for encrypting and decrypting the generated segments.

Also, each caching server in the group of caching servers 705 may operate as discussed above to receive requests from client devices, pass the requests to a segmentation server in the group of segmentation servers 110, and pass replies from the segmentation server to the client devices. The caching servers 705 also probe the segmentation servers to verify at least one segmentation server is available for fulfilling requests. The caching servers 705 also facilitate failover from one segmentation server to the next in the even that a segmentation sever is determined to no longer be available. By providing multiple caching servers in the group of caching servers 705, a failure of one of the caching servers will not disrupt streaming content to client devices.

Figure 8:
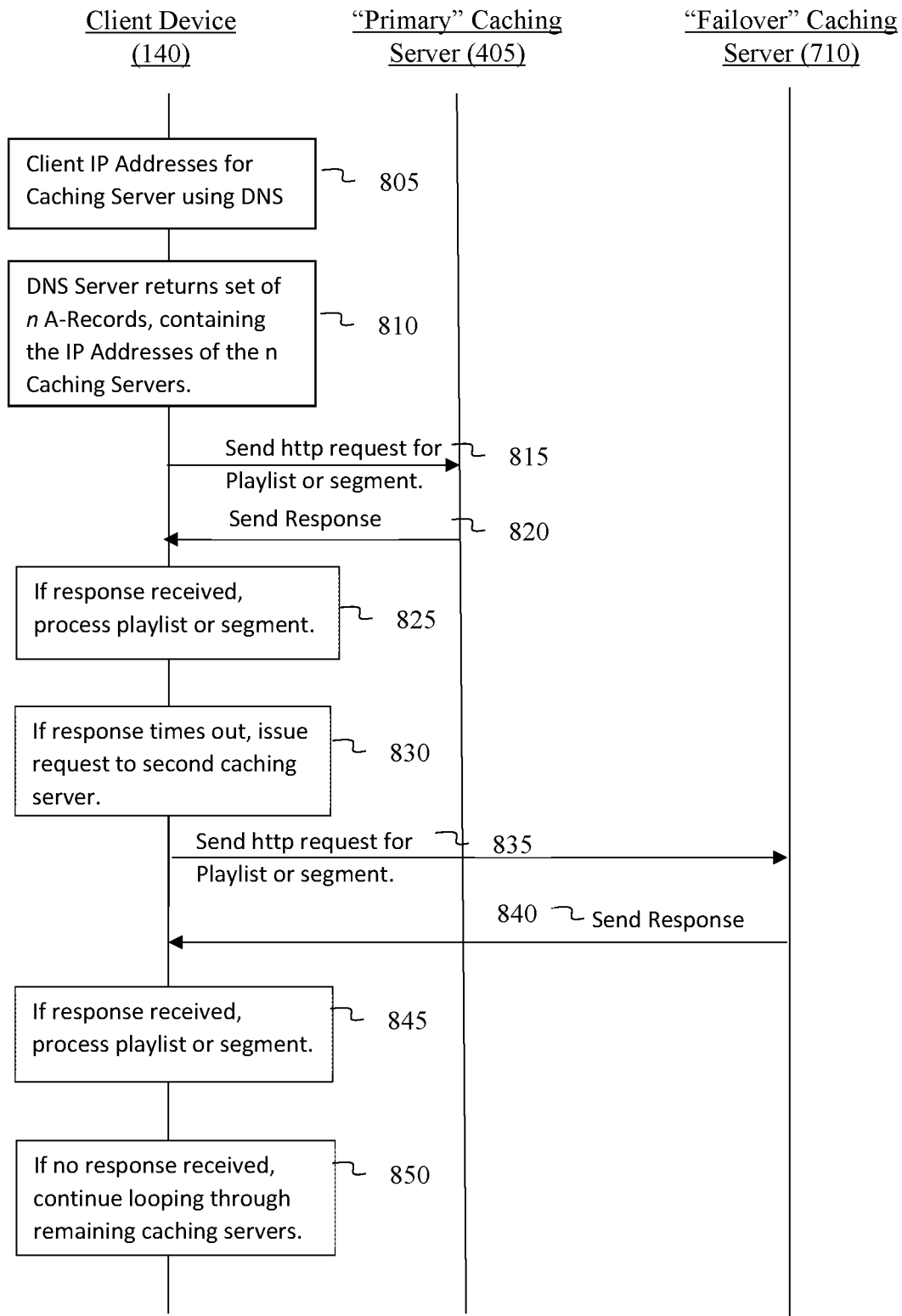
FIG. 8 shows an exemplary sequence diagram for facilitating failover from a primary caching server to a failover caching server according to various embodiments of the disclosure.

FIG. 8 shows an exemplary sequence diagram for facilitating failover from a primary caching server 405 to a failover caching server 710 according to various embodiments of the disclosure. When a caching server is being used, the client device 140 will access the caching server using a Domain Name System (DNS) request, at 805. The DNS server will return a set of n A-records, where n is the number of caching servers in the group of caching servers 705, containing an IP address for each of the caching servers, at 810. When the client device 140 requires a playlist, segment, or decryption key, it will make an HTTP request to the caching server, at 815. Initially the request will go to the "Primary" Caching Server 405, which has the first IP address in the set of n A-records. If a response is received at 820, then the client device 140 will process the playlist, segment, or decryption key according to the client's design. If, at 830, a response is not received within a small timeout, of no more than a few seconds, then the client device 140 will in turn send a request, at 835, to the "Failover" Caching Server 710, which has the second IP address in the set of n A-records. If a response is received at 840, then the client device 140 will process the playlist, segment, or decryption key according to the client's design at 845. The client device 140 will continue to send a request, at 845, to each server in the group of caching servers until it gets a reply. Once a reply is received, the IP address of that caching server will become the priority IP address, and that caching server will be probed first in subsequent http requests, to avoid subsequent delays when searching for a caching server that is online.

The caching servers in the group of caching servers may or may not be in the same geographic location, and the set of segmentation servers they know about may or may not be same for each caching server. However, using the various embodiments of this disclosure, the playlists, segments, and keys served to the client device 140 will be the same regardless of the caching server or segmentation server being referenced.

It should be appreciated that the logical operations described herein with respect to the various figures may be implemented (1) as a sequence of computer implemented acts or program modules (i.e., software) running on a computing device (e.g., the computing device described in FIG. 9), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Figure 9:
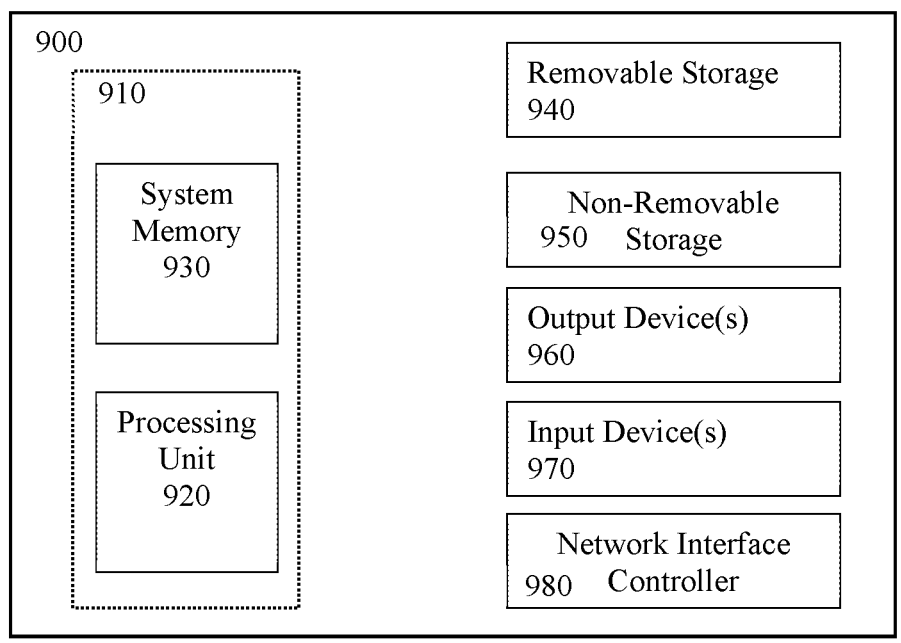
FIG. 9 illustrates an exemplary computer system suitable for implementing the several embodiments of the disclosure.

Referring to FIG. 9, an example computing device 900 upon which embodiments of the invention may be implemented is illustrated. For example, each of the content source, key server, segmentations servers, caching servers, and client devices described herein may each be implemented as a computing device, such as computing device 900. It should be understood that the example computing device 900 is only one example of a suitable computing environment upon which embodiments of the invention may be implemented. Optionally, the computing device 900 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 900 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 900 to provide the functionality of a number of servers that is not directly bound to the number of computers in the computing device 900. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 900 typically includes at least one processing unit 906 and system memory 904. Depending on the exact configuration and type of computing device, system memory 904 may be volatile (such as random access memory (RAM)), non-volatile (such as read-only memory (ROM), flash memory, etc.), or some combination of the two. This most basic configuration is illustrated in FIG. 9 by dashed line 902. The processing unit 906 may be a standard programmable processor that performs arithmetic and logic operations necessary for operation of the computing device 900. While only one processing unit 906 is shown, multiple processors may be present. Thus, while instructions may be discussed as executed by a processor, the instructions may be executed simultaneously, serially, or otherwise executed by one or multiple processors. The computing device 900 may also include a bus or other communication mechanism for communicating information among various components of the computing device 900.

Computing device 900 may have additional features/functionality. For example, computing device 900 may include additional storage such as removable storage 908 and non-removable storage 910 including, but not limited to, magnetic or optical disks or tapes. Computing device 900 may also contain network connection(s) 916 that allow the device to communicate with other devices such as over the communication pathways described herein. The network connection(s) 916 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 900 may also have input device(s) 914 such as keyboards, keypads, switches, dials, mice, track balls, touch screens, voice recognizers, card readers, paper tape readers, or other well-known input devices. Output device(s) 912 such as printers, video monitors, liquid crystal displays (LCDs), touch screen displays, displays, speakers, etc. may also be included. The additional devices may be connected to the bus in order to facilitate communication of data among the components of the computing device 900. All these devices are well known in the art and need not be discussed at length here.

The processing unit 906 may be configured to execute program code encoded in tangible, computer-readable media. Tangible, computer-readable media refers to any media that is capable of providing data that causes the computing device 900 (i.e., a machine) to operate in a particular fashion. Various computer-readable media may be utilized to provide instructions to the processing unit 906 for execution. Example tangible, computer-readable media may include, but is not limited to, volatile media, non-volatile media, removable media, and non-removable media implemented in any method or technology for storage of information such as computer readable instructions, data structures, program modules or other data. System memory 904, removable storage 908, and non-removable storage 910 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 906 may execute program code stored in the system memory 904. For example, the bus may carry data to the system memory 904, from which the processing unit 906 receives and executes instructions. The data received by the system memory 904 may optionally be stored on the removable storage 908 or the non-removable storage 910 before or after execution by the processing unit 906.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fault tolerant system for streaming content to client devices, comprising:
   a first segmentation server configured to receive a content stream from a content source, segment the content stream into a set of segments, based on a playback clock, and generate a playlist, wherein the playlist comprises a list of the set of segments for the content stream and a location for each of the segments in the set of segments, wherein the first segmentation server is configured to independently determine a segment number for each of the segments in the set of segments based on the playback clock and a target segment duration; and
   a second segmentation server configured to receive the content stream from the content source, segment the content stream into a second set of respective segments, based on a playback clock, and generate a second playlist, wherein the second playlist comprises a second list of the second set of the respective segments for the content stream and a location for each of the respective segments in the second set of segments, wherein the second segmentation server is configured to independently determine a second segment number for each of the respective segments in the second set of segments based on the playback clock and the target segment duration,
   wherein the respective segments from the second set of segments are the same as the segments from the set of segments and the second segment number for each of the respective segments in the second set of segments is the same as the segment number for each of the segments in the set of segments;
   wherein the second segmentation server is further configured to receive a request from a client device for the respective segment in the second set of segments when the first segmentation server is not available, the second segmentation server configured to provide a requested segment in the second set of segments;
   a caching server in communication with the first segmentation server and the second segmentation server, the caching server configured to receive a request for a requested segment and pass the request for the requested segment to the first segmentation server or the second segmentation server, wherein the caching server is further configured to periodically probe the first segmentation server and verify whether the first segmentation server is available in response to the periodic probe.

2. The system of claim 1, wherein the first segmentation server is further configured to generate a variant playlist that contains a list of member stream playlists available for the content stream, including the playlist.

3. The system of claim 2, wherein the variant playlist includes a location of where the member stream playlists can be retrieved and an optional set of alternate locations where the member stream playlists can be retrieved.

4. The system of claim 1, further comprising:
   a key server in communication with the first segmentation server and the second segmentation server, wherein the key server is configured to generate a first encryption key in response to receiving a request from the first segmentation server comprising a first segment offset and a content stream name of the content stream, and wherein the key server is further configured to generate a second encryption key in response to receiving a request from the second segmentation server comprising the first segment offset and the content stream name of the content stream,
   wherein the first encryption key is the same as the second encryption key.

5. The system of claim 4, wherein the first segmentation server is further configured to encrypt a first segment in the set of segments corresponding to the first segment offset using the first encryption key, and
   wherein the second segmentation server is further configured to encrypt a first segment in the second set of segments corresponding to the first segment offset using the second encryption key.

6. The system of claim 1, wherein the first segmentation server is further configured to receive a request from a client device for a segment in the set of segments, the first segmentation server further configured to provide the requested segment in the set of segments.

7. The system of claim 1, wherein the caching server is further configured to pass the request for the segment to the second segmentation server in response to a determination that the first segmentation server is unavailable.

8. A fault tolerant system for streaming content to client devices, comprising:
  a first segmentation server configured to receive a content stream from a content source, segment the content stream into a set of segments based on a playback clock, and generate a playlist, wherein the playlist comprises a list of the set of segments for the content stream and a location for each of the segments in the set of segments, wherein the first segmentation server is configured to independently determine a segment number for each of the segments in the set of segments based on a playback clock and a target segment duration;
  a second segmentation server configured to receive the content stream from the content source, segment the content stream into a second set of respective segments based on a playback clock, and generate a second playlist, wherein the second playlist comprises a second list of the second set of the respective segments for the content stream and a location for each of the respective segments in the second set of segments, wherein the second segmentation server is configured to independently determine a second segment number for each of the respective segments in the second set of segments based on the playback clock and the target segment duration, wherein the second segment number for each of the respective segments in the second set of segments is the same as the segment number for each of the segments in the set of segments; and
  a caching server in communication with the first segmentation server and the second segmentation server, the caching server configured to receive a request for a requested segment and pass the request for the requested segment to the first segmentation server or the second segmentation server, wherein the caching server is further configured to periodically probe the first segmentation server and verify whether the first segmentation server is available in response to the periodic probe.

9. The system of claim 8 wherein the caching server is configured to pass the request for the requested segment to the first segmentation server based on a determination that the first segmentation server is available in response to the periodic probe.

10. The system of claim 9, wherein the caching server is further configured to pass the request for the requested segment to the second segmentation server based on a determination that the first segmentation server is unavailable in response to the periodic probe.

11. The system of claim 10, wherein the caching server is further configured to periodically probe the second segmentation server and verify whether the second segmentation server is available in response to the periodic probe.

12. The system of claim 8, wherein the first segmentation server is further configured to receive a first encryption key from a key server in response to a request for the first encryption key, wherein the first segmentation server is configured to encrypt a segment in the set of segments with the first encryption key, and
  wherein the second segmentation server is further configured to receive the first encryption key from the key server in response to a second request for the first encryption key, wherein the second segmentation server is configured to encrypt a second segment in the second set of segments with the first encryption key.

13. The system of claim 12, wherein the request for the first encryption key comprises a first segment offset corresponding to the segment in the set of segments and the second request for the first encryption key comprises a second segment offset corresponding to the second segment in the second set of segments, and
  wherein the first segment offset is the same as the second segment offset.

14. The system of claim 13, wherein the request for the first encryption key and the second request for the first encryption key further comprises a stream name of the content.

15. The system of claim 8, wherein the first segmentation server is configured to segment the content stream into the set of segments in accordance with an adaptive bitrate standard selected from the group consisting of HTTP Live Streaming, MPEG-DASH, HTTP Dynamic Streaming, and HTTP Smooth Streaming.

16. The system of claim 8, further comprising a second caching server in communication with the first segmentation server and the second segmentation server, the second caching server configured to receive the request for the requested segment when the caching server is unavailable, the second caching server further configured to pass the request for the requested segment to the first segmentation server or the second segmentation server.

17. The system of claim 8, wherein the second set of segments are the same as the set of segments.

* * * * *